(12) United States Patent  (10) Patent No.: US 8,152,083 B2
Bower et al.  (45) Date of Patent: Apr. 10, 2012

(54) APPARATUS FOR PREPARING FOOD

(75) Inventors: Andrew Charles Bower, Cambirdge (GB); Michael Axel Martin Nuber, Teningen (DE); Herfried Pucher, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/935,620

(22) PCT Filed: Mar. 25, 2009

(86) PCT No.: PCT/IB2009/051246
§ 371 (c)(1),
(2), (4) Date: Oct. 29, 2010

(87) PCT Pub. No.: WO2009/122327
PCT Pub. Date: Oct. 8, 2009

(65) Prior Publication Data
US 2011/0186669 A1  Aug. 4, 2011

(30) Foreign Application Priority Data
Apr. 2, 2008 (EP) .................................. 08153935

(51) Int. Cl.
*A47J 43/046* (2006.01)

(52) U.S. Cl. .......... 241/65; 241/282.1; 366/205
(58) Field of Classification Search .......... 99/413, 99/339, 348; 366/205; 241/65, 66, 67, 282.1, 241/282.2, 199.12
See application file for complete search history.

(56) References Cited

U.S. PATENT DOCUMENTS

| | | | |
|---|---|---|---|
| 5,469,782 A | 11/1995 | Wong | |
| 5,794,524 A | 8/1998 | Kemker et al. | |
| 6,505,545 B2 | 1/2003 | Kennedy et al. | |
| 6,598,515 B1 | 7/2003 | Bove | |
| 6,802,641 B2 | 10/2004 | Ladatto et al. | |
| 7,617,766 B2 * | 11/2009 | Tracy et al. ...... | 99/413 |
| 2008/0047439 A1 | 2/2008 | Tracy et al. | |

FOREIGN PATENT DOCUMENTS
WO 2005094648 A1 10/2005
* cited by examiner

*Primary Examiner* — Mark Rosenbaum

(57) ABSTRACT

Apparatus for preparing food, for instance baby food, the apparatus (1) comprising a receptacle (3) for receiving food to be prepared, a blending assembly comprising a blender element (10) for blending the food and heating means arranged for heating the food, wherein a first end (4) of the receptacle (3) is adapted to cooperate with the heating means to heat the food and wherein the blender element (10) is provided at an opposite second end (5) of the receptacle (3), such that in use an orientation of the receptacle (3) relative to the apparatus (1) is adaptable for switching between a heating operation and a blending operation.

14 Claims, 5 Drawing Sheets

APPARATUS FOR PREPARING FOOD

FIELD OF THE INVENTION

The invention relates to an apparatus for preparing food, for instance baby food, the apparatus comprising a receptacle for receiving food to be prepared, a blending assembly comprising a blender element for blending the food and heating means arranged for heating the food.

BACKGROUND OF THE INVENTION

Such apparatuses are known from practice and can be used to prepare baby food from fresh ingredients such as vegetables, meat, fish and the like. The known apparatus comprises heating means for heating or cooking the food and a blending assembly for blending the heated or cooked food. Such apparatuses are used to prepare food, for instance baby food, by boiling or steaming the food ingredients that are placed in the receptacle. After cooking the food ingredients, said ingredients are blended in order to get food with a mashed composition that is suitable for a baby. The known apparatuses comprise a lot of different parts, which parts may have to be reconfigured during the processing of the food to allow the apparatus to perform a heating operation as well as a blending operation. Therefore, the use of such an apparatus can be time consuming or even complicated. For instance, it may be necessary to open the receptacle for positioning the blender element within the receptacle or for changing other parts to be able to switch from the heating operation to the blending operation. Due to the relatively large number of parts, the apparatus requires a lot of cleaning time after having used said apparatus.

It is therefore an object of the invention, to provide an apparatus for preparing food, for instance baby food, which apparatus can cook and blend the food in an efficient manner, wherein at the same time the apparatus is easy to use.

SUMMARY OF THE INVENTION

To that end, an apparatus according to the invention is characterized in that a first end of the receptacle is adapted to cooperate with the heating means to heat the food and that the blender element is provided at an opposite second end of the receptacle, such that in use an orientation of the receptacle relative to the apparatus is adaptable for switching between a heating operation and a blending operation.

By having an apparatus comprising such a receptacle with said construction, it is not necessary to change or add parts to the receptacle before or after the heating or blending operation. First, the receptacle has to be placed in the apparatus in a first orientation relative to said apparatus such that the second end of the receptacle can cooperate with the heating means to be able to carry out the heating operation. After finishing the heating operation, the orientation of the receptacle relative to the apparatus has to be changed, such that the blender element can be actuated to blend the food. Such an apparatus does not require opening of the receptacle after the heating operation of the food ingredients in order to change the apparatus to be suitable for blending. In fact, the apparatus can even be adapted to another kind of operation with only using one hand. Furthermore, the food ingredients stay in the receptacle during the entire food preparation process, which provides a hygienic way of preparing food. Also, the number of parts is limited and the parts are easily detachable. Consequently, an easy to use apparatus is provided, which after use is easy to clean.

To be able to use the apparatus for blending, the first end of the receptacle has to be positioned on the apparatus. Therefore, in further elaboration of the invention, the first end of the receptacle comprises a first coupling element for providing a fluid connection between an inner side of the receptacle and the heating means such that generated steam for heating the food can be fed to the inner side of the receptacle. Due to such coupling element, the receptacle can be easily coupled to the apparatus in a way that a fluid connection is provided between the heating means and the inner side of the receptacle to allow generated steam to enter the inner side of the receptacle to heat the food ingredients. After termination of the heating operation, the orientation of the receptacle relative to the apparatus has to be changed in order to be able to use the apparatus for the blending operation. Therefore, according to a further embodiment of the invention, the second end of the receptacle can comprise a second coupling element for operably coupling the blender element to a driving mechanism provided in the apparatus. Such coupling element provides easy positioning of the receptacle on the apparatus and allows the driving mechanism to be easily coupled to the blender element. It is advantageous, that according to a further elaboration of the invention, the blender element is rotatably arranged on the second coupling element extending from said coupling element to the inner side of the receptacle, wherein the driving mechanism is arranged in a body of the apparatus such that in use the driving mechanism engages on the blender element to rotate the blender.

In a further embodiment of the invention, the first coupling element comprises a steam inlet that is positionable adjacent a steam outlet in fluid connection with a reservoir for fluid provided in a body of the apparatus, which inlet and outlet are arranged to cooperate to provide the fluid connection.

It can be advantageous that at least one of the first and the second coupling elements comprises a positioning element that cooperates with a positioning element provided on said apparatus such that the receptacle can be positioned in one way correctly on the apparatus. Due to such positioning elements, a user can put the receptacle onto the apparatus and rotate the receptacle until both positioning elements engage with each other, for instance because one of the elements comprises a male part and one of the elements comprises a female part. The user can easily feel or see that the receptacle is positioned in a predetermined way. This further enables easy use of the apparatus.

In yet another embodiment of the invention, at least on of the first coupling element and the second coupling element can be a lid that is removably arranged on said respective first and/or second end of the receptacle. By removing one of the coupling elements, the receptacle can be easily filled and emptied. Preferably, both coupling elements are removable to further enable easy cleaning of the different parts of the receptacle.

According to a further elaboration of the invention, the reservoir for fluid is positioned adjacent a heating source of the heating means such that the heating means can heat the fluid in the reservoir to converse the fluid into steam. For instance by placing heating wires against a wall of the reservoir, heat generated by the wires can be transferred via the wall to the fluid in the reservoir.

During heating of the food ingredients inside the receptacle fluids will be released, which fluids can comprise condensate, vitamins and flavour elements or the like. Preferably, in yet another embodiment of the invention, at the first end of the receptacle, a fluid collector is provided which is arranged for collecting fluid during the heating operation. Such a fluid collector can be provided between the inner side of the receptacle and the first coupling element or the fluid collector can be, in another embodiment of the invention, part of the second coupling element.

By collecting said fluid in a fluid collector, the fluid is not wasted but can be reused. For instance, after blending of the food ingredients, the collected fluid, or at least part of the collected fluid, can be added to the food in order to adjust the consistency of the blended food. Therefore it is favourable, according to a further elaboration of the invention, if the fluid collector comprises a dosing element for dosing fluid to the inner side of the receptacle. By using the dosing element, a user can dose the amount of fluid that he wishes to add to the food. Such a dosing element can for instance be a button, a knob, a valve or any other suitable element.

In another embodiment of the invention, in the inner side of the receptacle at least partly at a distance of the steam inlet a food support is provided, which support is arranged to hold the food to be heated at a distance from the steam inlet thereby allowing the steam to protrude and surround the food. Such a food support, which preferably comprises an amount of steam openings, enables better and more even heating of the food that is placed in the receptacle. To further increase the easy of use and cleaning of the apparatus, it is advantageous if the food support is removably provided in the receptacle. However, in another embodiment of the invention, the food support can be part of the first coupling element or can be removably coupled to the first coupling element before putting the coupling element onto the receptacle.

BRIEF DESCRIPTION OF THE DRAWINGS

To explain the invention, exemplary embodiments thereof will hereinafter be described with reference to the accompanying drawings, wherein.

Similar features in the different figures are indicated by similar reference numerals.

DETAILED DESCRIPTION OF EMBODIMENTS

Figure 1:
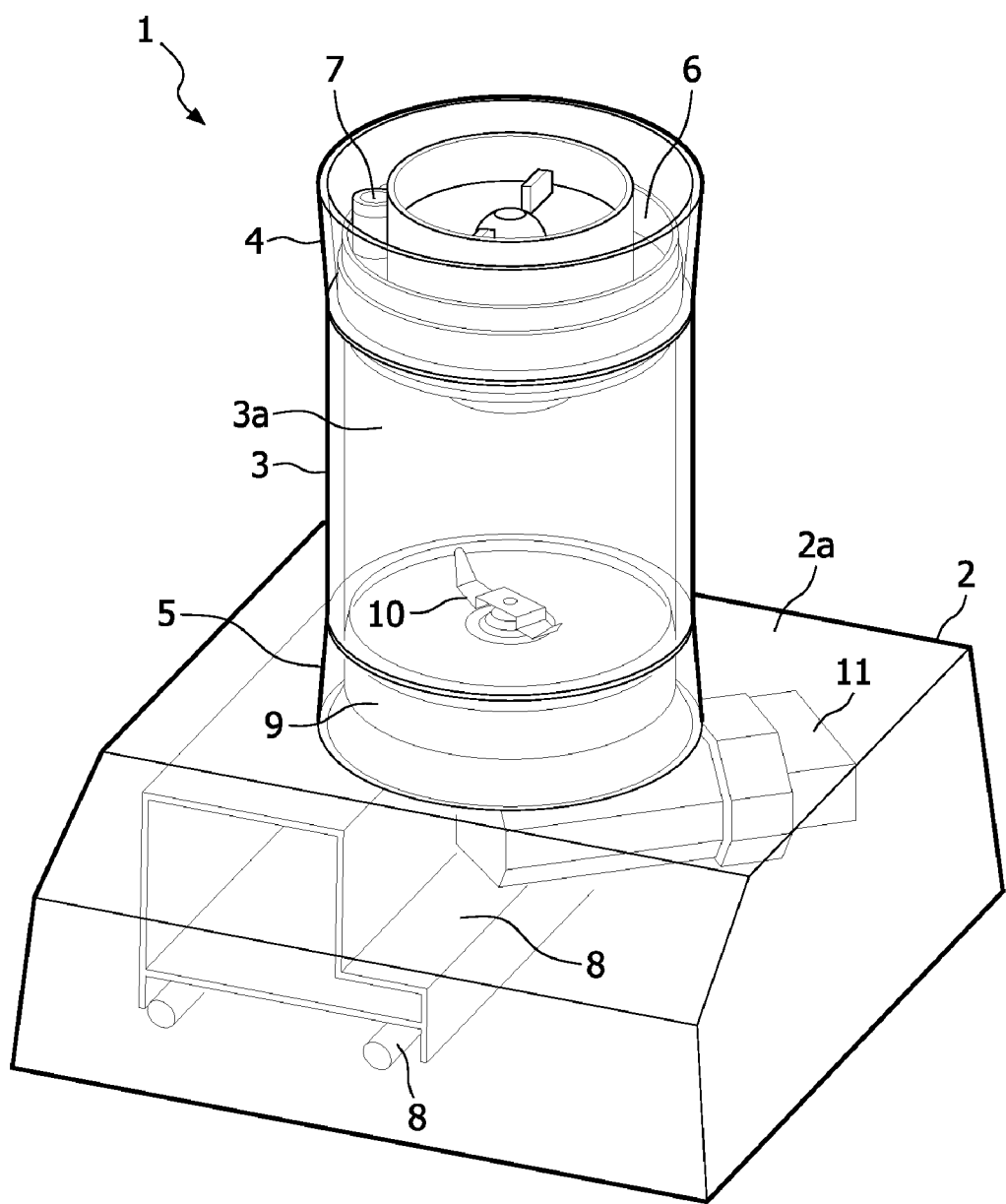
FIG. 1 schematically shows a perspective view of the apparatus according to an embodiment of the invention.

FIG. 1 shows the apparatus 1 for preparing food, for instance baby food, according to an embodiment of the invention. The apparatus 1 is a compact apparatus and comprises a body 2 and a receptacle 3 for receiving food F (see FIGS. 3-7) to be prepared. The receptacle 3 is removably coupled to the body 2, more in particular to an upper side 2a of the body 2. The receptacle 3 comprises two ends 4, 5. A first end 4 comprises a first coupling element 6 that is adapted for providing a fluid connection between the inner side 3a of the receptacle 3 and the heating means 8. The fluid connection is provided after positioning of the receptacle 3 such that the apparatus 1 is configured to perform a heating operation (see for instance FIG. 6). The fluid connection is formed by the steam inlet 7 and the adjacent positioned steam outlet 17, that is connected to the reservoir for fluid 18. The fluid connection allows generated steam to enter the inner side 3a of the receptacle 3 in order to heat the food ingredients placed in the receptacle 3. Preferably, the steam inlet 7 comprises a one-way valve (not shown) in order to prevent food from leaving the inner side 3a of the receptacle 3 and entering the fluid reservoir 18. Also other ways of preventing food from reaching the fluid reservoir 18 can be used.

Figure 2:
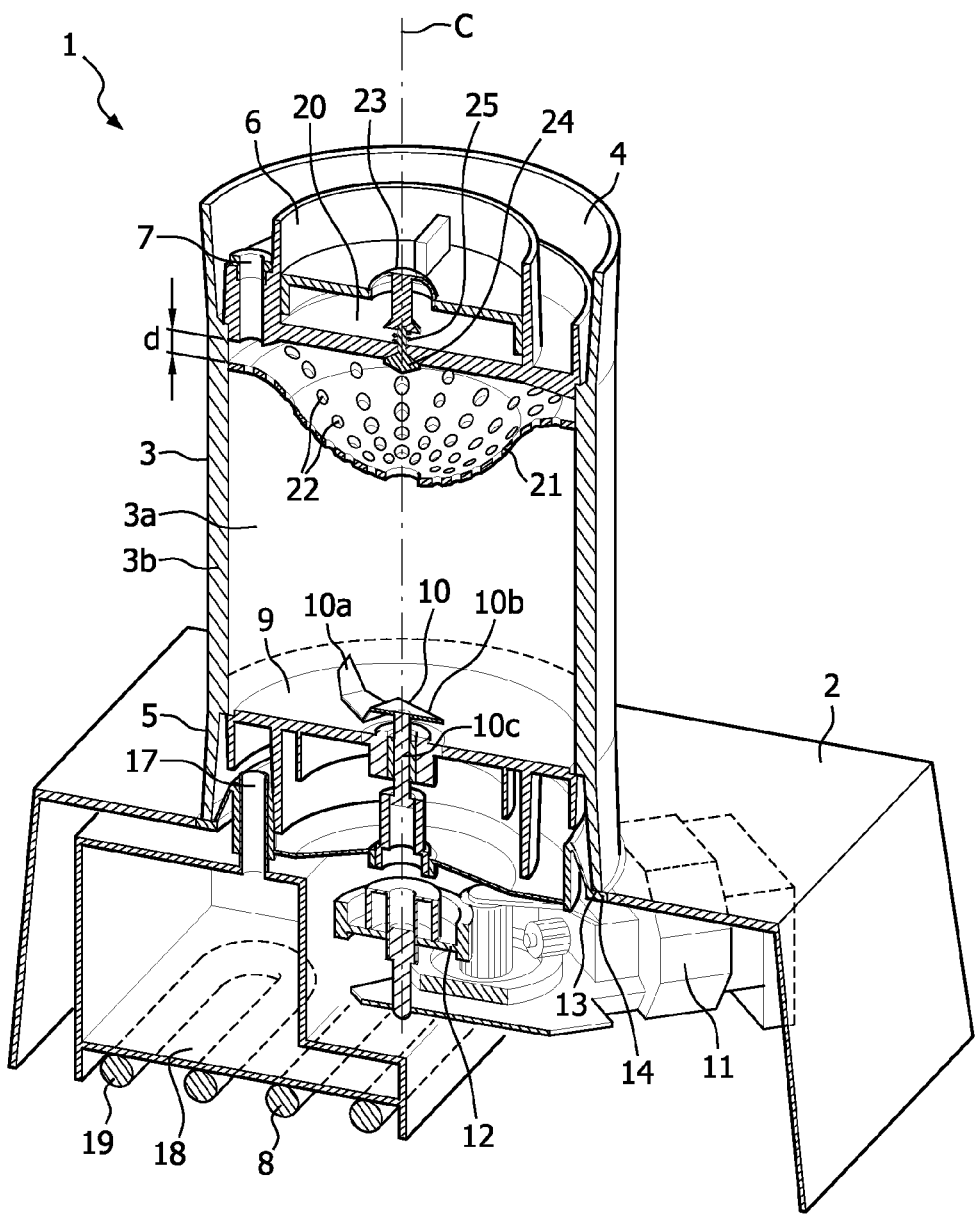
FIG. 2 schematically shows a perspective cross sectional view of the apparatus of FIG. 1.
Figure 3:
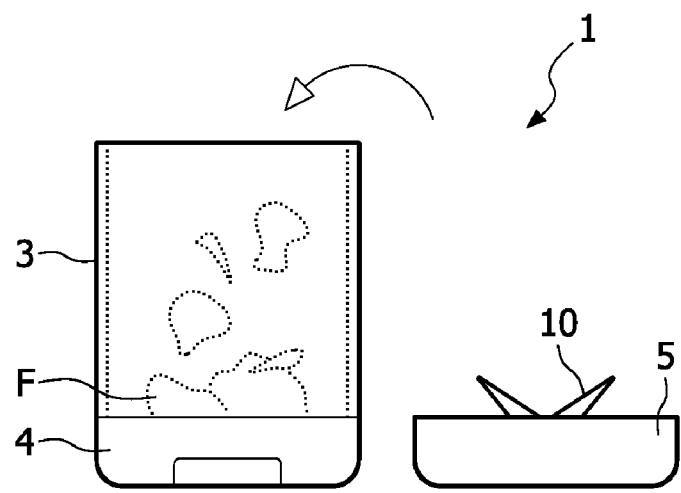
FIGS. 3-7 schematically show side views of the apparatus according to an embodiment of the invention, in different operating positions.
Figure 4:
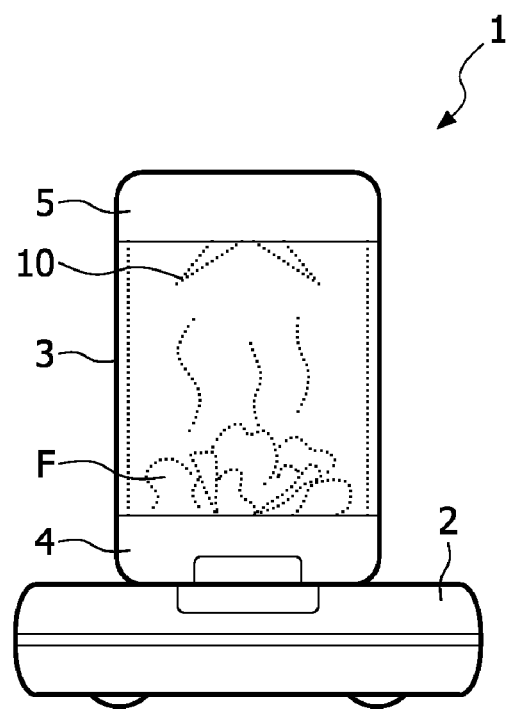
Figure 5:
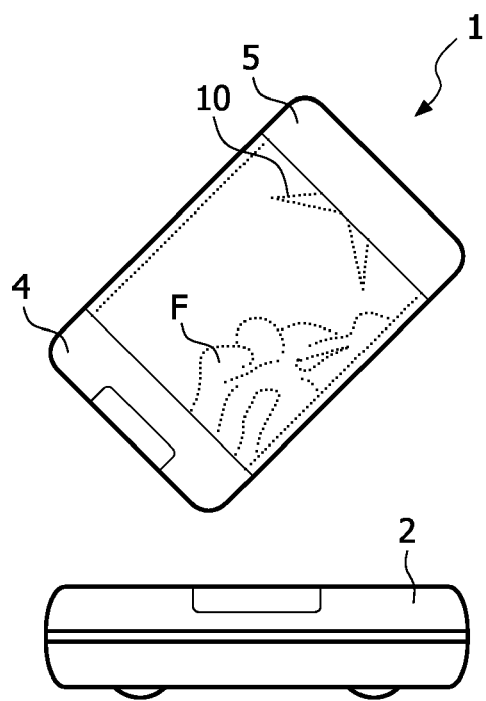

At the second opposite end 5 of the receptacle 3 a second coupling element 9 is provided, which coupling element 9 is adapted to operably couple the blender element 10 to the driving mechanism 11 provided in the body 2 of the apparatus 1 (see FIG. 2). The blender element 10 comprises two blades 10a, 10b that in use are rotated for cutting the heated or cooked food ingredients into smaller pieces, or even to get a liquid like composition of the food. Instead of a blender element 10 comprising blades 10a, 10b other kinds of blender elements can be used as well.

The receptacle 3 with the two coupling elements 4, 5 provides easy switching between the heating operation of the apparatus 1 and the blending operation of the apparatus 1. By taking the receptacle 3 off the body 2 of the apparatus 1 and rotating it substantially 180 degrees around an axis substantially perpendicular to a central axis c of the receptacle 3, the function of the apparatus 1 can be changed. In FIGS. 1 and 2, the apparatus 1 is configured to blend food ingredients F in the inner side 3a of the receptacle 3. As is clearly visible in FIG. 2, the second coupling element 9 couples the receptacle 3 to the body 2 of the apparatus 1. Therefore, the second coupling element 9 can for instance comprise a circumferential rim 13 that extends from the receptacle 3. A circumferential groove 14 that is adapted to cooperate with the rim 13 can be provided in the body 2 of the apparatus 1. When being in the blending operation position, the rim 13 is positioned within the groove 14, thereby at the same time coupling the blender element 10, or more specifically, a shaft 10c of the blender element 10, to the driving mechanism 11 by means of a gearing 12. In another embodiment of the invention it is also possible that a rim is provided on an upper side 2a of the body 2 and that a groove adapted to cooperate with the rim is provided on the receptacle 3. Also other possible coupling elements, for instance comprising a thread, can be used to reach a similar effect.

Preferably, the receptacle 3 is made of relatively light material, such that the receptacle 3 comprising the food ingredients is easy to handle and not too heavy. Furthermore, it is advantageous if the wall 3b or at least part of the wall 3b of the receptacle 3 is substantially heat insulating, such that a user will not easily burn his fingers when he has to turn the receptacle 3 after finishing the heating operation. The fluid reservoir 18 is positioned adjacent a heating source 19 of the heating means 8. The heating source 19 can comprise heating wires or other suitable sources capable of heating the fluid in the reservoir 18 resulting in steam.

The receptacle 3 further comprises a fluid collector 20 for collecting fluid during the heating operation. When the apparatus 1 is configured in the heating operation position, the fluid collector 20 is situated in a lower end of the receptacle 3, said end facing the body 2 of the apparatus 1. When food is heated or cooked, it releases fluid for instance comprising vitamins and flavours. The fluid will automatically flow down into the fluid collector 20, wherein the fluid is stored. The fluid stays in the fluid collector 20, even when the receptacle 3 will be rotated to be brought in the blending operation position. The fluid collector 20 comprises a dosing element 23 that can be used to dose the collected fluid to the inner side 3a of the receptacle 3 for adding said fluid to the food to be blended. According to the amount of added fluid, the structure and/or composition of the food can be changed. Furthermore, vitamins available in the food before cooking can be preserved and returned in the cooked food.

In order to provide an even distribution of steam through and around the food to be heated or cooked, the receptacle 3 comprises a food support 21. The food support 21 is arranged to hold the food to be heated at least partly at a distance d from the steam inlet 7. Consequently, the steam fed into the receptacle 3 can be evenly distributed under the food support 21. The food support 21 comprises an amount of steam openings 22 that allow the steam to pass through the food support 21 and subsequent to protrude and surround the food such that the food will be heated by the steam. The food support 21 can be removably arranged in the receptacle 3, but can also be connected to the first coupling element 4, such that by removing the first coupling element 4 the food support 21 is also removed.

Referring to FIGS. 3-7, the above described apparatus 1 may function as follows.

A user of the apparatus 1 fills the fluid reservoir 18 in the body 2 with water. Therefore, the reservoir 18 may be removable from the body 2 or an opening can be provided in the body 2 through which the reservoir 18 can be filled. The receptacle 3 is opened by removing one of the coupling elements 6, 9, preferably the lid comprising the blender element 10 (see FIG. 3). Food ingredients F are put in the inner side 3a of the receptacle 3. The food ingredients F will rest on the food support 21 that is provided adjacent the first coupling element 6 at a distance d from the steam inlet 7. This support 21 allows steam to protrude and surround the food ingredients F such that all ingredients are heated or cooked. After placing the receptacle 3 on the upper side 2a of the body 2 of the apparatus 1, thereby placing the steam outlet 17 and the steam inlet 7 such that the fluid connection between the reservoir 18 and the inner side 3a of the receptacle 3 is provided, the user turns on the apparatus 1. The heating source 19 provided in the body 2 of the apparatus 1 will heat the water in the reservoir 18 such that steam is produced (see FIG. 4). The steam will enter the inner side 3a of the receptacle 3. When the heating or cooking of the food is finished, the heating source 19 stops heating the water. Preferably, the user is notified of the ending of the heating operation by the apparatus 1. Therefore, the apparatus 1 can comprise a signaling element for giving a visual and/or an audio signal. The user can take the receptacle 3 off the body 2 and rotate it around 180° to switch from the heating operation position to the blending operation position (see FIG. 5). Due to gravity, the food will drop down from the food support 21 onto the blender element 10. After changing the orientation of the receptacle 3, it is possible, but not necessary, to remove the first coupling element 6, for instance to add other food ingredients F or remove food that sticks to the inner wall surface of the receptacle 3. Furthermore, it is possible to push the fluid dosing button 23 to release fluid from the fluid collector 20 into the inner side 3a of the receptacle 3, thus to the cooked food. The fluid dosing button 23 is arranged to release a desired amount of fluid. The fluid dosing button 23 comprises a valve 24 that closes the opening between the fluid collection element 20 and the inner side 3a of the receptacle 3. By pushing the button 23, the valve 24 opens. After releasing the button, the valve 24 automatically closes because of the spring 25 that is arranged between the valve 24 and the button 23.

Figure 6:
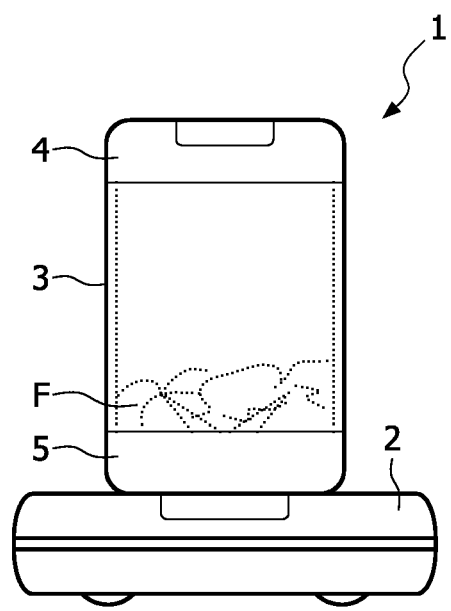
Figure 7:
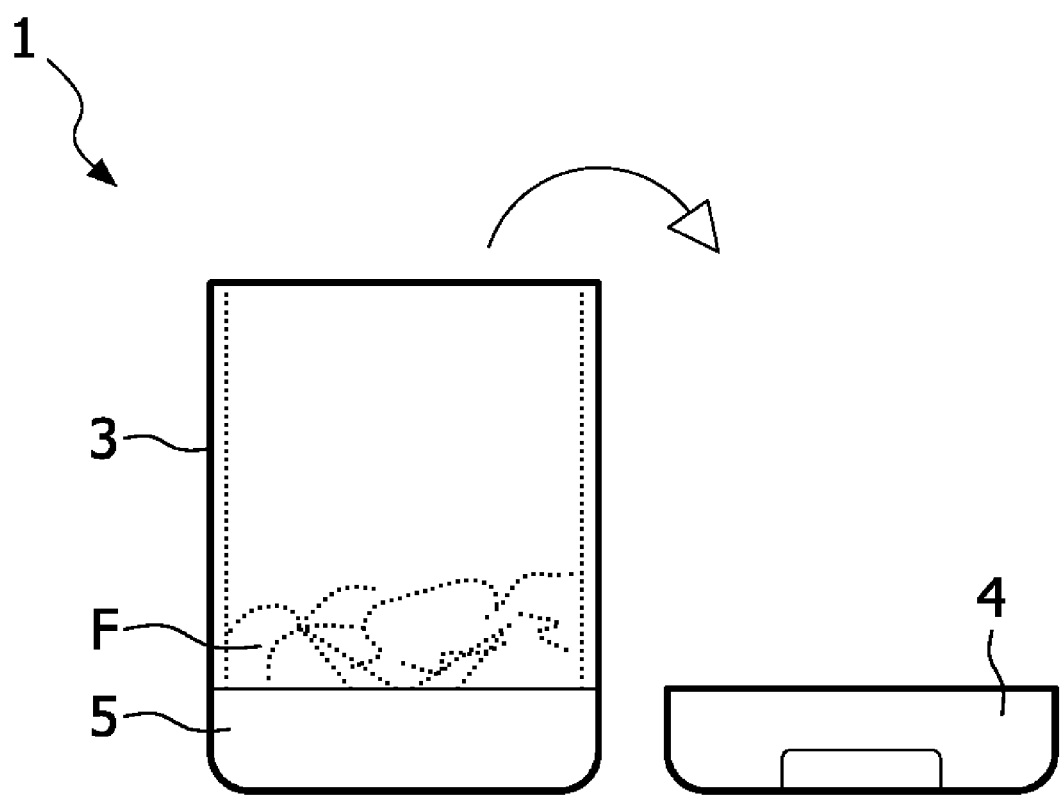

Then, the food ingredients F and any possible added ingredients can be blended by starting the blending operation (FIG. 6). The blender element 10 starts rotating, thereby cutting the food ingredients F into small pieces. After the blended food reaches the desired composition, the blending operation is stopped. The receptacle 3 can be removed from the body 2 of the apparatus 1 and one of the lids 6, 9 can be removed to be able to remove the food from the receptacle 3. When the use of the apparatus 1 is finished, the receptacle 3 can be taken apart by removing both coupling elements 6, 9 and by removing the food support 21 out of the receptacle 3, to be able to clean the apparatus 1.

The invention is not in any way limited to the exemplary embodiments presented in the description and drawings. All combinations (of parts) of the embodiments shown and described are explicitly understood to be incorporated within this description and are explicitly understood to fall within the scope of the invention. Moreover, many variations are possible within the scope of the invention, as outlined by the claims. Furthermore, any reference signs in the claims shall not be construed as limiting the scope of the invention. For instance, the apparatus can have different kinds of shapes; the receptacle can have different constructions as long as it can be turned to switch between a blending operation and cooking operation. Furthermore, the blender element can have different configurations and be driven in a different manner suitable for cutting the food in smaller pieces. It is also possible that the apparatus is made from different kinds of material. The coupling elements can have different a construction as well as the body of the apparatus adapted to cooperate with said coupling elements. It is even possible that the receptacle can be coupled to the body in an entire different way.

The invention claimed is:

1. Apparatus for preparing food, the apparatus comprising a receptacle for receiving food to be prepared, a blending assembly comprising a blender element for blending the food and heating means arranged for heating the food, wherein a first end of the receptacle is adapted to cooperate with the heating means to heat the food and that the blender element is provided at an opposite second end of the receptacle, such that in use an orientation of the receptacle relative to the apparatus is adaptable for switching between a heating operation and a blending operation, wherein the first end of the receptacle comprises a first coupling element for providing a fluid connection between an inner side of the receptacle and the heating means, the first coupling element extending away from the first end along an axis substantially parallel to a longitudinal axis of the receptacle.

2. Apparatus according to claim 1, wherein the inner side of the receptacle is fed generated steam for heating the food.

3. Apparatus according to claim 2, wherein at least one of the first coupling element and the second coupling element is a lid that is removably arranged on said respective first and/or second end of the receptacle.

4. Apparatus according to claim 2, wherein the first coupling element comprises a steam inlet that is positionable adjacent a steam outlet in fluid connection with a reservoir for fluid provided in a body of the apparatus, which inlet and outlet are arranged to cooperate to provide the fluid connection.

5. Apparatus according to claim 4, wherein the reservoir for fluid is positioned adjacent a heating source of the heating means such that the heating source can heat the fluid in the reservoir to convert the fluid into steam.

6. Apparatus according to claim 1, wherein the second end of the receptacle comprises a second coupling element for operably coupling the blender element to a driving mechanism provided in the apparatus.

7. Apparatus according to claim 6, wherein the blender element is rotatably arranged on the second coupling element extending from said coupling element to the inner side of the receptacle, wherein the driving mechanism is arranged in a body of the apparatus such that in use the driving mechanism engages on the blender element to rotate the blender element.

8. Apparatus according to claim 1, wherein at the first end of the receptacle a fluid collector is provided which is arranged for collecting fluid during the heating operation.

9. Apparatus according to claim 8, wherein the fluid collector is provided between the inner side of the receptacle and the first coupling element.

10. Apparatus according to claim 8, wherein the fluid collector is part of the first coupling element.

11. Apparatus according to claim 8, wherein the fluid collector comprise a dosing element for dosing fluid to the inner side of the receptacle.

12. Apparatus according to claim 1, wherein in the inner side of the receptacle at least partly at a distance (d) of the steam inlet a food support is provided, which support is arranged to hold the food to be heated at a distance from the steam inlet thereby allowing the steam to protrude and surround the food.

13. Apparatus according to claim 12, wherein the food support is removably provided in said receptacle.

14. Apparatus according to claim 1, wherein the food is baby food.

* * * * *